(12) United States Patent
Zhao et al.

(10) Patent No.: US 11,327,219 B2
(45) Date of Patent: May 10, 2022

(54) BACKLIGHT UNIT INCLUDING ENGAGING GROOVE AND PROTRUSION PORTION, METHOD FOR MANUFACTURING THE SAME AND DISPLAY DEVICE

(71) Applicant: Beijing Smart-aero Display Technology Co., Ltd., Beijing (CN)

(72) Inventors: Xing Zhao, Beijing (CN); Zhiguo Shen, Beijing (CN)

(73) Assignee: BEIJING SMART-AERO DISPLAY TECHNOLOGY CO., LTD., Beijing (CN)

( * ) Notice: Subject to any disclaimer, the term of this patent is extended or adjusted under 35 U.S.C. 154(b) by 551 days.

(21) Appl. No.: 16/339,498

(22) PCT Filed: Sep. 28, 2018

(86) PCT No.: PCT/CN2018/108258
§ 371 (c)(1),
(2) Date: Apr. 4, 2019

(87) PCT Pub. No.: WO2019/072100
PCT Pub. Date: Apr. 18, 2019

(65) Prior Publication Data
US 2021/0356653 A1 Nov. 18, 2021

(30) Foreign Application Priority Data

Oct. 12, 2017 (CN) .......................... 201721314649.6

(51) Int. Cl.
*F21V 8/00* (2006.01)
*G02F 1/1335* (2006.01)
(Continued)

(52) U.S. Cl.
CPC ........... *G02B 6/0088* (2013.01); *G02B 6/005* (2013.01); *G02B 6/0065* (2013.01);
(Continued)

(58) Field of Classification Search
CPC . G02B 6/005; G02B 6/0088; G02F 1/133388; G02F 1/133512; G02F 1/133524; G02F 1/133608
(Continued)

(56) References Cited

U.S. PATENT DOCUMENTS 5,988,827 A * 11/1999 Lee ................... G02F 1/133615
362/633
2006/0126357 A1* 6/2006 Huang .............. G02F 1/133615
362/611
(Continued)

FOREIGN PATENT DOCUMENTS

CN 201174015 Y 12/2008
CN 203240405 U 10/2013
(Continued)

OTHER PUBLICATIONS

International Search Report dated Nov. 22, 2018 corresponding to application No. PCT/CN2018/108258.

*Primary Examiner* — Keith G. Delahoussaye
(74) *Attorney, Agent, or Firm* — Kinney & Lange, P.A.

(57) ABSTRACT

A backlight unit, a display device, and a method for manufacturing a backlight unit are provided. The backlight unit includes a light guide plate including a main body and a first protrusion portion protruding from a side of the main body; a plastic frame provided at a periphery of the side of the light guide plate, wherein a side of the plastic frame proximal to the light guide plate has an engaging groove provided thereat, and the first protrusion portion of the light guide plate protrudes towards the plastic frame and is engaged in the engaging groove; and a light shielding structure provided on a light exit surface of the first protrusion portion, wherein an orthographic projection of the light shielding structure on (Continued)

the light exit surface of the first protrusion portion partially covers the light exit surface of the first protrusion portion.

18 Claims, 2 Drawing Sheets

(51) Int. Cl.
*G02F 1/13357* (2006.01)
*G02F 1/1333* (2006.01)

(52) U.S. Cl.
CPC .. *G02F 1/133524* (2013.01); *G02F 1/133608* (2013.01); *G02F 1/133388* (2021.01); *G02F 1/133512* (2013.01)

(58) Field of Classification Search
USPC .................................................. 362/606, 607
See application file for complete search history.

(56) References Cited

U.S. PATENT DOCUMENTS

2012/0320628 A1* 12/2012 Chang .................. G02B 6/0043
362/609
2015/0382490 A1* 12/2015 Shen ...................... G06F 1/1601
361/679.01

FOREIGN PATENT DOCUMENTS

| CN | 207216222 U | 4/2018 |
| JP | 2003228066 A | 8/2003 |

* cited by examiner

BACKLIGHT UNIT INCLUDING ENGAGING GROOVE AND PROTRUSION PORTION, METHOD FOR MANUFACTURING THE SAME AND DISPLAY DEVICE

CROSS-REFERENCE TO RELATED APPLICATIONS

This is a National Phase Application filed under 35 U.S.C. 371 as a national stage of PCT/CN2018/108258, filed Sep. 28, 2018, an application claiming the benefit of Chinese Patent Application No. 201721314649.6, filed on Oct. 12, 2017, the contents of each of which are incorporated herein in their entirety by reference.

TECHNICAL FIELD

The present disclosure relates to the field of display technology, and in particular, relates to a backlight unit, a display device, and a method for manufacturing a backlight unit.

BACKGROUND

In a liquid crystal display device, since a liquid crystal layer thereof cannot emit light itself, a backlight unit, which is one of the main components of the liquid crystal display device, functions as a surface light source that provides uniform light. Generally, the backlight unit may include a light emitting diode (LED) light source, a reflector, a light guide plate, a lower diffusion film, a prism sheet, and an upper diffusion film. The LED light source is a point light source, and the light emitted from the LED light source becomes a surface light source under the functions of the reflector, the light guide plate and the lower diffusion film, and then is converged to a certain degree after passing through and exiting from parallel convex structures on the prism sheet. Thus, a brightness of the backlight unit over the desired range of viewing angle is increased.

SUMMARY

Embodiments of the present disclosure provide a backlight unit, a display device, and a method for manufacturing a backlight unit.

Some embodiments of the present disclosure provide a backlight unit, which includes
a light guide plate including a main body and a first protrusion portion protruding from a side of the main body;
a plastic frame provided at a periphery of the side of the light guide plate, wherein a side of the plastic frame proximal to the light guide plate has an engaging groove provided thereat, and the first protrusion portion of the light guide plate protrudes towards the plastic frame and is engaged in the engaging groove; and
a light shielding structure provided on a light exit surface of the first protrusion portion, wherein an orthographic projection of the light shielding structure on the light exit surface of the first protrusion portion partially covers the light exit surface of the first protrusion portion.

In an embodiment, the light shielding structure includes a first portion and a second portion;
the first portion covers outer edges of the light exit surface of the first protrusion portion; and
the second portion covers a portion of a central region surrounded by the outer edges of the light exit surface of the first protrusion portion, and an area, which is covered by the second portion, of the light exit surface of the first protrusion portion gradually decreases as the second portion extends from a side of the first protrusion portion distal to the main body to a side of the first protrusion portion proximal to the main body.

In an embodiment, the light exit surface of the first protrusion portion is a rectangle, a side of the rectangle is attached to the main body, a direction from a side of the rectangle distal to the main body to a side of the rectangle proximal to the main body is a first direction, and a direction perpendicular to the first direction is a second direction; and
the second portion includes at least one first pattern, and a size of each of the at least one first pattern in the second direction gradually decreases as the at least one first pattern extends in the first direction.

In an embodiment, each of the at least one first pattern is an isosceles triangle.

In an embodiment, each of the at least one first pattern is a trapezoid.

In an embodiment, the second portion includes a plurality of first patterns, and the plurality of first patterns are arranged sequentially in the second direction with a same interval therebetween.

In an embodiment, a length ratio of a short base to a long base of the trapezoid ranges from ¼ to ½.

In an embodiment, a size of a part of the first portion, which covers one of the outer edges of the light exit surface of the first protrusion portion, in the second direction ranges from 1/20 to 1/10 of a size of the first protrusion portion in the second direction.

In an embodiment, a size of a part of the first portion, which covers one of the outer edges of the light exit surface of the first protrusion portion, in the first direction ranges from 1/20 to 1/10 of a size of the first protrusion portion in the first direction.

In an embodiment, the light shielding structure is in contact with the light exit surface of the first protrusion portion.

In an embodiment, the backlight unit further includes an optical film provided on the light exit surface of the light guide plate, wherein the optical film includes a second protrusion portion extending into the engaging groove, and the light shielding structure is provided on a side of the second protrusion portion distal to the light guide plate.

In an embodiment, the light shielding structure is made of a black ink.

In an embodiment, in the first direction, two ends of each of the at least one first pattern are both in contact with the first portion.

In an embodiment, in the second direction, edges of any adjacent two of the plurality of first patterns distal to the main body are in contact with each other.

In an embodiment, a bottom side of the isosceles triangle is parallel to the side of the first protrusion portion distal to the main body.

In an embodiment, the trapezoid is an isosceles trapezoid.

In an embodiment, a long base of the trapezoid is parallel to the side of the first protrusion portion distal to the main body.

Some embodiments of the present disclosure provide a display device, which includes the backlight unit according to any one of the above embodiments of the present disclosure.

Some embodiments of the present disclosure provide a method for manufacturing a backlight unit, including forming a light guide plate, wherein the light guide plate includes a main body and a first protrusion portion protruding from a side of the main body;

forming a plastic frame, wherein the plastic frame is provided at a periphery of the side of the light guide plate, a side of the plastic frame proximal to the light guide plate has an engaging groove provided thereat, and the first protrusion portion of the light guide plate protrudes towards the plastic frame and is engaged in the engaging groove; and forming a light shielding structure, wherein the light shielding structure is provided on a light exit surface of the first protrusion portion, and an orthographic projection of the light shielding structure on the light exit surface of the first protrusion portion partially covers the light exit surface of the first protrusion portion.

In an embodiment, the forming a light shielding structure including forming a first portion of the light shielding structure, wherein the first portion covers outer edges of the light exit surface of the first protrusion portion; and forming a second portion of the light shielding structure, wherein the second portion covers a portion of a central region surrounded by the outer edges of the light exit surface of the first protrusion portion, and an area, which is covered by the second portion, of the light exit surface of the first protrusion portion gradually decreases as the second portion extends from a side of the first protrusion portion distal to the main body to a side of the first protrusion portion proximal to the main body.

DETAILED DESCRIPTION

To enable one of ordinary skill in the art to better understand technical solutions of the present disclosure, a backlight unit, a method for manufacturing a backlight unit, and a display device according to the present disclosure will be described in detail below with reference to the accompanying drawings and specific embodiments.

The inventors of the present disclosure have found that in order to firmly fix a light guide plate, projecting lugs are often provided at a left edge and a right edge of the light guide plate. In the case where the light guide plate is provided with the projecting lugs, a plastic frame, for covering and fixing the edges of the backlight unit, may fix the light guide plate more firmly. Light is transmitted at the positions of the projecting lugs and is reflected by the plastic frame which is white, resulting in a locally brightening phenomenon at the positions of the projecting lugs. Such a phenomenon is usually referred to as an edge light leakage phenomenon (i.e., a light leakage phenomenon occurring at an edge). If a black cover layer is employed to cover an entire light exit surface of each of the projecting lugs, a locally darkening phenomenon will occur at the position of each of the projecting lugs. Further, employment of a black plastic frame may reduce the light leakage phenomenon at the position of each of the projecting lugs, but the light absorption characteristics of the black plastic frame will result in light loss of an entire backlight unit.

Therefore, it is a technical problem to be solved urgently to eliminate the locally brightening phenomenon or the locally darkening phenomenon occurring at the position of each of the projecting lugs in a backlight unit.

In view of the above disadvantages existing in the related art, embodiments of the present disclosure provide a backlight unit, a display device, and a method for manufacturing a backlight unit. In the backlight unit, a light shielding structure is provided on a light exit surface of a first protrusion portion of a light guide plate, and the light shielding structure partially covers the light exit surface of the first protrusion portion. In this way, the light leakage phenomenon occurring at a position at which the first protrusion portion is provided is mitigated or eliminated, and a locally brightening phenomenon or a locally darkening phenomenon is prevented from occurring at the position at which the first protrusion portion is provided, thereby increasing the performance of the backlight unit.

Figure 1:
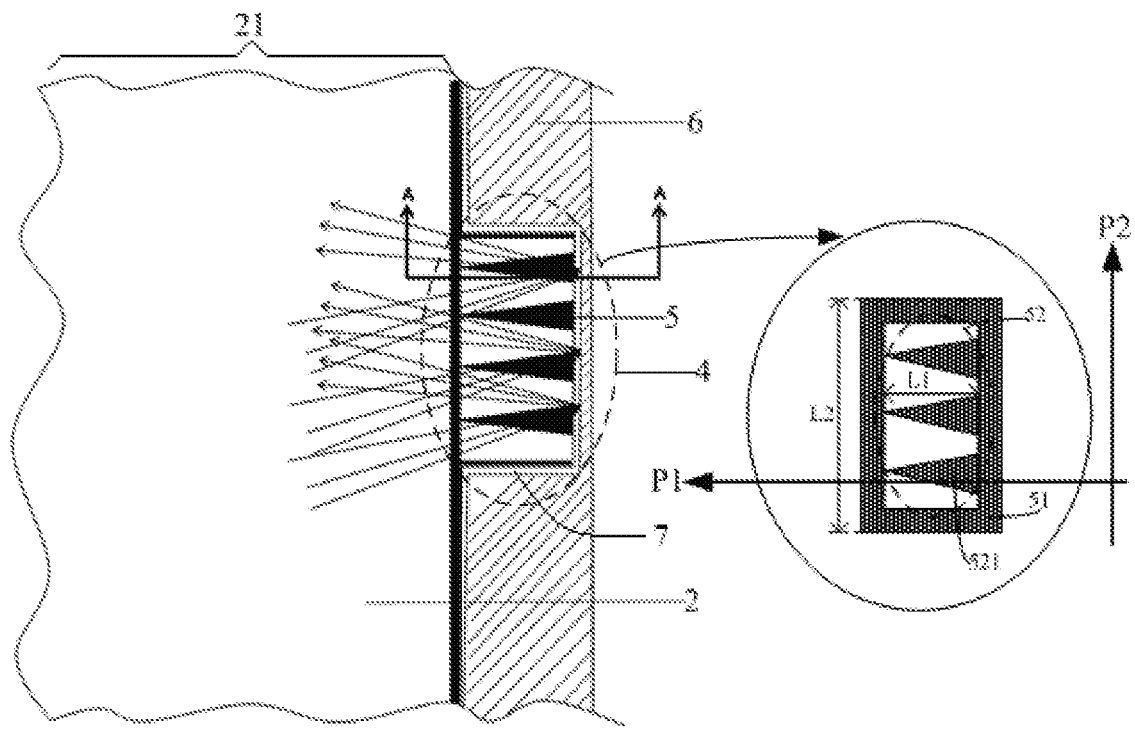
FIG. 1 is a schematic top view showing a structure of a portion of a backlight unit according to an embodiment of the present disclosure.
Figure 2:
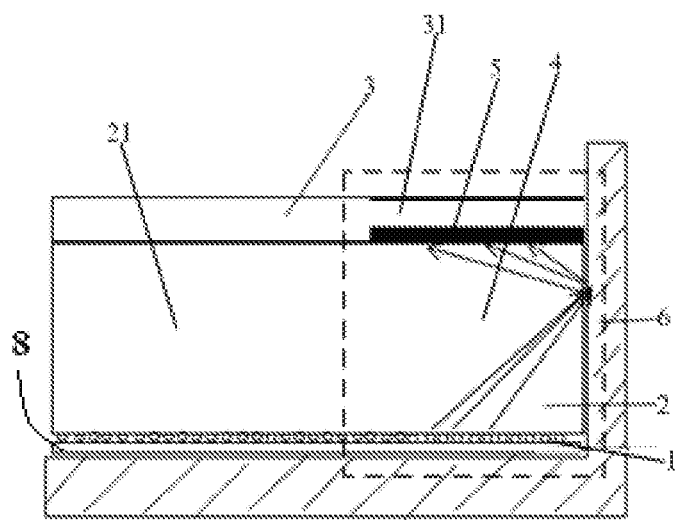
FIG. 2 is a schematic diagram showing a cross section of the backlight unit as shown in FIG. 1 taken along the line A-A as shown in FIG. 1.

An embodiment of the present disclosure provides a backlight unit. As shown in FIGS. 1 and 2, the backlight unit includes a light guide plate 2 and a plastic frame 6 provided at the periphery of a side of the light guide plate 2. An engaging groove 7 is provided at a side of the plastic frame 6 proximal to the light guide plate 2, and the light guide plate 2 includes a main body 21 and a first protrusion portion 4 protruding from a side of the main body 21 towards the plastic frame and being engaged in the engaging groove. The backlight unit may further include a light shielding structure 5 provided on a light exit surface of the first protrusion portion 4, and an orthographic projection of the light shielding structure 5 on the light exit surface of the first protrusion portion 4 partially covers the light exit surface of the first protrusion portion 4. In an embodiment, the light guide plate 2 may have a shape which is substantially a rectangle. In an embodiment, each of two opposite sides of the light guide plate 2 may be provided with one first protrusion portion 4. Alternatively, each of four sides of the light guide plate 2 may be provided with one first protrusion portion 4. In an embodiment, each side of the light guide plate 2 may be provided with at least two first protrusion portions 4. The plastic frame 6 has a shape matching with a profile of the light guide plate 2, and the number of the engaging grooves 7 provided at each side of the plastic frame 6 is equal to the number of the first protrusion portions 4 on the corresponding side of the light guide plate 2.

For example, the side of the light guide plate 2 may be may be a lateral side of the light guide plate 2 for the purposes of fixing and packaging by the plastic frame 6. The main body 21 of the light guide plate 2 may be a portion of the light guide plate 2 for uniformly mixing the light emitted from a light source in the backlight unit. The first protrusion portion 4 of the light guide plate 2 may serve to increase the fixation of the light guide plate 2. The first protrusion portion 4 may be provided at a side of the main body 21 of the light guide plate 2, and may be engaged in the engaging groove of the plastic frame 6, thereby packaging and fixing the light guide plate 2 of backlight unit more firmly.

By providing the light shielding structure 5 on the light exit surface of the first protrusion portion 4 of the light guide plate 2, and making the light shielding structure 5 partially cover the light exit surface of the first protrusion portion 4, not only a light leakage phenomenon occurring at a position at which the first protrusion portion 4 is provided is mitigated or eliminated, but also a locally brightening phenomenon or a locally darkening phenomenon is prevented from occurring at the position at which the first protrusion portion 4 is provided, thereby increasing the performance of the backlight unit.

In an embodiment, the light shielding structure 5 may include a first portion 51 and a second portion 52. The first portion 51 may cover outer edges of the light exit surface of the first protrusion portion 4, and may have a shape of rectangular ring, as shown in FIG. 1. The second portion 52 may cover a portion of a central region surrounded by the outer edges of the light exit surface of the first protrusion portion 4, and an area, which is covered by the second portion 52, of the light exit surface of the first protrusion portion 4 gradually decreases, as the second portion 52 extends in a direction from a side of the first protrusion portion 4 distal to the main body 21 to a side of the first protrusion portion 4 proximal to the main body 21 (i.e., the first direction P1 as shown in FIG. 1). Such a configuration significantly reduces an amount of leakage light at the side of the first protrusion portion 4 distal to the main body 21, as compared with the case where light is not shielded at the position of the first protrusion portion 4 in the related art, thereby mitigating the locally brightening phenomenon at the position of the first protrusion portion 4 significantly. At the side of the first protrusion portion 4 proximal to the main body 21, the light shielding structure 5 has a small area for shielding light, which not only reduces an amount of leakage light at the side of the first protrusion portion 4 proximal to the main body 21 so as to mitigate the locally brightening phenomenon at the position of the first protrusion portion 4, but also makes the light at the side of the first protrusion portion 4 proximal to the main body 21 not too dark so as to mitigate the locally darkening phenomenon at the position of the first protrusion portion 4 due to light being completed blocked at the position of the first protrusion portion 4 in the related art.

In an embodiment, the light exit surface of the first protrusion portion 4 is a rectangle, and a side of the rectangle is attached to the main body 21. As described above, a direction from a side of the rectangle distal to the main body 21 to a side of the rectangle proximal to the main body 21 is the first direction P1, and a direction perpendicular to the first direction P1 is a second direction P2, as shown in FIG. 1. The second portion 52 includes at least one first pattern 521, and a size of each of the at least one first pattern 521 in the second direction P2 gradually decreases as the first pattern 521 extends in the first direction P1. As a result, an orthographic projection of each of the at least one first pattern 521 on the light exit surface of the first protrusion portion 4 gradually decreases in the first direction P1.

In other words, the first protrusion portion 4 which is a rectangle has a first side (e.g., the left side in FIG. 1) proximal to the main body 21 and a second side (e.g., the right side in FIG. 1) distal to the main body 21, as well as two lateral sides (e.g., the upper and lower sides in FIG. 1) connecting between the first side and the second side. The first direction P1 is directed form the second side to the first side, and the second direction P2 is perpendicular to the first direction P1. The second portion 52 includes at least one first pattern 521, a size of each of the at least one first pattern 521 in the second direction P2 gradually decreases as the first pattern 521 extends in the first direction P1. Thus, an orthographic projection of each of the at least one first pattern 521 on the light exit surface of the first protrusion portion 4 gradually decreases in the first direction P1.

In an embodiment, the second portion 52 may include a plurality of (i.e., at least two) first patterns 521, and the plurality of first patterns 521 are arranged sequentially in the second direction P2 with a same interval therebetween. With such a configuration, it is advantageous for uniformly mitigating leakage light at the position of the first protrusion portion 4 and uniformly mitigating the brightening phenomenon or the darkening phenomenon at the position of the first protrusion portion 4, thereby achieving more uniform light exiting from the position of the first protrusion portion 4 under the partial shielding by the light shielding structure 5.

In an embodiment, each of the first patterns 521 may have a shape of an isosceles triangle. The bottom side (i.e., the base) of the isosceles triangle is parallel to and in contact with the second side of the first protrusion portion 4, and is in contact with the side of the first portion 51 proximal to the main body 21, the first portion 51 covering the second side of the first protrusion portion 4 (in other words, two ends of each of the first patterns 521 are in contact with the first portion 51, respectively, as shown in FIG. 1). With such a configuration, a light shielding area of each of the first patterns 521 gradually decreases from the side of the first protrusion portion 4 distal to the main body 21 to the side of the first protrusion portion 4 proximal to the main body 21, thereby mitigating or eliminating the locally brightening phenomenon at the position of the first protrusion portion 4 due to light not being shielded at all or the locally darkening phenomenon at the position of the first protrusion portion 4 due to light being completely shielded in the related art.

In an embodiment, in the second direction P2, two base angles of any adjacent two of the isosceles triangles (i.e., the first patterns 521) may be in contact with each other, i.e., any adjacent two of the first patterns 521 may have a distance of zero therebetween. Thus, the light leakage phenomenon at the side (i.e., the second side) of the first protrusion portion 4 distal to the main body 21 may be avoided.

In an embodiment, in the first direction P1, a portion of the first portion 51 covering the first side and a portion of the first portion 51 covering the second side have a first distance L1 therebetween, as shown in FIG. 1. Further, in the first direction P1, a maximal size of each of the first patterns 521 may be equal to the first distance L1. By providing the plurality of isosceles triangles on the light exit surface of the first protrusion portion 4, a portion of light exiting from the light exit surface of the first protrusion portion 4 may exit from a region between any adjacent two of the isosceles triangles, and a brightness of light exiting from the side of the first protrusion portion 4 distal to the main body 21 is smaller than a brightness of light exiting from the side of the first protrusion portion 4 proximal to the main body 21. In this way, the locally brightening phenomenon at the position of the first protrusion portion 4 due to light not being shielded at all or the locally darkening phenomenon at the position of the first protrusion portion 4 due to light being completely shielded is mitigated or eliminated.

In an embodiment, in the second direction P2, a portion of the first portion 51 covering one of the outer edges of the light exit surface of the first protrusion portion 4 may have a size (i.e., a width of the upper or lower side of the first portion 51 which has a shape of rectangular ring as shown in FIG. 1) ranging from $1/20$ to $1/10$ of a size (i.e., L2 as shown in FIG. 1) of the first protrusion portion 4 in the second direction P2. In the first direction P1, a portion of the first portion 51 covering one of the outer edges of the light exit surface of the first protrusion portion 4 may have a size (i.e., a width of the left or right side of the first portion 51 which has a shape of rectangular ring as shown in FIG. 1) ranging from 1/20 to 1/10 of a size (i.e., the distance between the first side and the second side) of the first protrusion portion 4 in the first direction P1.

In other words, in the second direction P2, two of the outer edges of the light exit surface of the first protrusion portion 4 have a second distance L2 therebetween. In the second direction P2, a size of the portion of the first portion 51 covering one of the outer edges ranges from 1/20 to 1/10 of the second distance L2. In the first direction P1, a size of each of the portions of the first portion 51 covering the first side and the second side ranges from 1/20 to 1/10 of the first distance L1. The first portion 51 may shield the light exiting from the outer edges of the first protrusion portion 4, thereby preventing the first protrusion portion 4 from being viewed due to leakage light at the outer edges thereof, and increasing the overall performance of the backlight unit.

In an embodiment, the light shielding structure 5 is provided on the light exit surface of the first protrusion portion 4. In an embodiment, the light shielding structure 5 is a light shielding film made of a black ink. The light shielding structure 5 made of a black ink can shield (or block) light. The light shielding structure 5 made of such a material may be manufactured easily, i.e., may be manufactured by coating the black ink onto the light exit surface of the first protrusion portion 4.

In an embodiment, the backlight unit may further include an optical film 3 provided on the light exit surface of the light guide plate 2, and the optical film 3 may include a second protrusion portion 31 extending into the engaging groove 7. The light shielding structure 5 may be provided between the first protrusion portion 4 and the second protrusion portion 31 (as shown in FIG. 2), or may be provided on the second protrusion portion 31 (not shown). In other words, the light shielding structure 5 may be provided at a side of the second protrusion portion 31 proximal to the first protrusion portion 4, or a side of the second protrusion portion 31 distal to the first protrusion portion 4 (not shown). The light shielding structure 5 can mitigate or eliminate the locally brightening phenomenon or the locally darkening phenomenon at the position of the first protrusion portion 4, regardless of being provided at which side of the optical film 3. By providing the optical film 3 with the second protrusion portion 31, fixing and packaging of the optical film 3 in the backlight unit may be more reliable.

In an embodiment, an orthographic projection of the second protrusion portion 31 on the light guide plate 2 coincides (i.e., completely overlaps) with the light exit surface of the first protrusion portion 4.

In an embodiment, the optical film 3 is a first diffuser, In another embodiment, the optical film 3 may further include an optical lens layer and a second diffuser (not shown) sequentially stacked at a side of the first diffuser distal to the light guide plate. The light shielding structure 5 may also be provided at a side of the second diffuser proximal to the optical lens layer (or the light guide plate 2). Alternatively, the light shielding structure 5 may also be provided at a side of the second diffuser distal to the optical lens layer (or the light guide plate 2) (not shown). The light shielding structure 5 can mitigate or eliminate the locally brightening phenomenon or the locally darkening phenomenon at the position of the first protrusion portion 4, regardless of being provided at which side of the second diffuser.

In an embodiment, the light shielding structure 5 may further includes portions covering sides of the light guide plate 2 other than the side at which the first protrusion portion 4 is located. With such a configuration, light leakage at other sides of the light guide plate 2 may be avoided, thereby increasing the performance of the backlight unit.

In an embodiment, the backlight unit may further include a light source 1 and may be of a direct-type backlight unit, i.e., the light source 1 is provided at a side (i.e., the lower surface of the light guide plate 2 as shown in FIG. 2) of the light guide plate 2 opposite to the light exit surface (i.e., the upper surface of the light guide plate 2 as shown in FIG. 2), and light emitted from the light source 1 directly enters into the light guide plate 2. Alternatively, the backlight unit may be a side-entry backlight unit, i.e., the light source 1 may be provided at a lateral side of the light guide plate 2. In an embodiment, the backlight unit may further include a reflector 8. The light source 1 is provided between the light guide plate 2 and the reflector 8 (as shown in FIG. 2), such that the reflector 8 may reflect the light incident thereon to the light guide plate 2, thereby increasing the performance of the backlight unit.

In an embodiment, the plastic frame 6 encloses outer sides of the light guide plate 2 and the optical film 3 which are stacked on each other, to fix the light guide plate 2 and the optical film 3 together. The plastic frame 6 may be of white color. The white plastic frame 6 has a small absorbance for light, thereby reducing the loss of light emitted from the light source 1.

Figure 3:
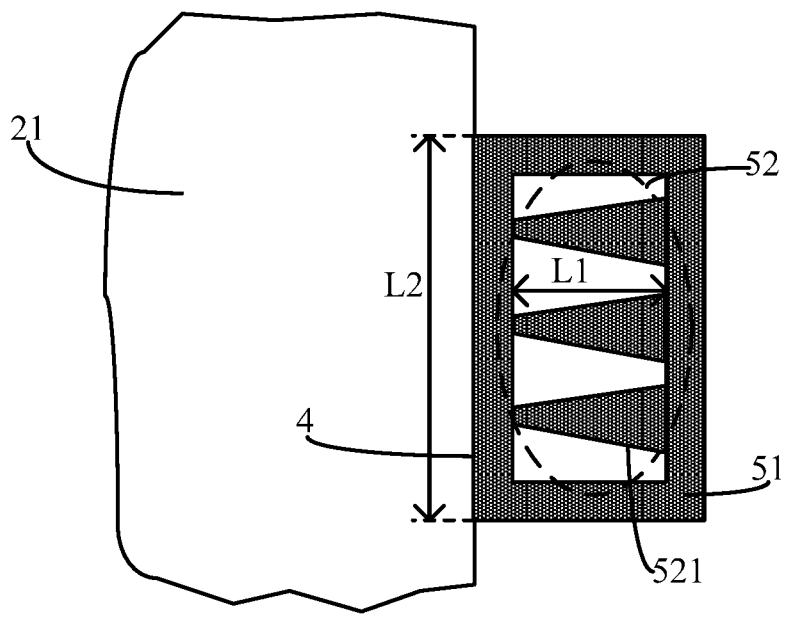
FIG. 3 is a schematic diagram showing a structure of a portion of a backlight unit according to an embodiment of the present disclosure, the portion being around a first protrusion portion of the backlight unit.
Figure 4:
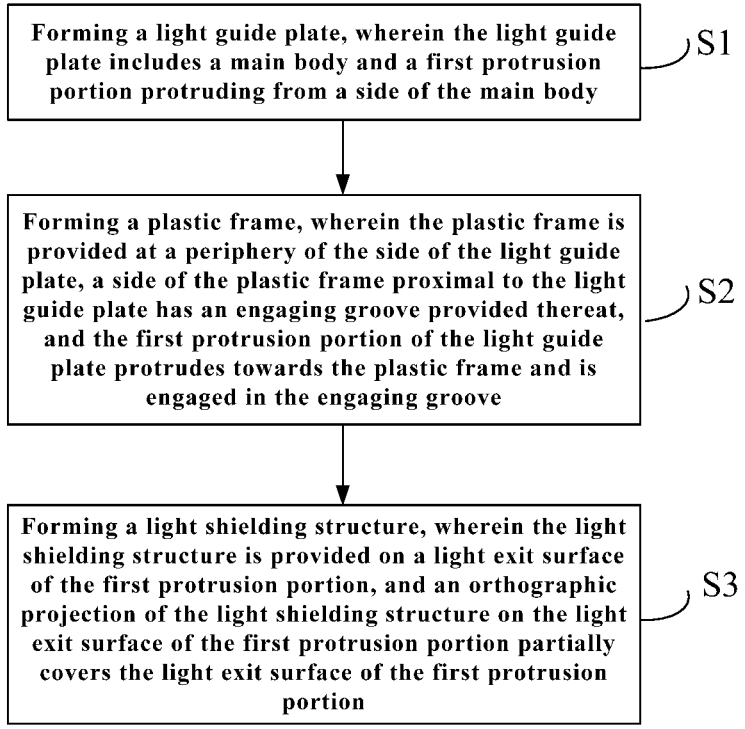
FIG. 4 is a schematic flowchart showing a method for manufacturing a backlight unit, according to an embodiment of the present disclosure.

An embodiment of the present disclosure provides another backlight unit, as shown in FIG. 3. Compared with the backlight unit as shown in FIG. 1, in the backlight unit as shown in FIG. 3, each of the first patterns 521 has a shape of a trapezoid (e.g., and isosceles trapezoid). The long base (i.e., the right side as shown in FIG. 3) of the trapezoid is parallel to and in contact with the second side of the first protrusion portion 4, and the short base (i.e., the left side as shown in FIG. 3) of the trapezoid is in contact with the side of the first portion 51 proximal to the main body 21, the first portion 51 covering the second side of the first protrusion portion 4 (in other words, two ends of each of the first patterns 521 are in contact with the first portion 51, respectively).

With such a configuration, a light shielding area of each of the first patterns 521 also gradually decreases from the side of the first protrusion portion 4 distal to the main body 21 to the side of the first protrusion portion 4 proximal to the main body 21, thereby mitigating or eliminating the locally brightening phenomenon at the position of the first protrusion portion 4 due to light not being shielded at all or the locally darkening phenomenon at the position of the first protrusion portion 4 due to light being completely shielded in the related art.

In an embodiment, a length ratio of the short base to the long base of the trapezoid may range from 1/4 to 1/2. With such a configuration, the locally brightening phenomenon at the position of the first protrusion portion 4 due to light not being shielded at all or the locally darkening phenomenon at the position of the first protrusion portion 4 due to light being completely shielded in the related art may be mitigated or eliminated more effectively.

Other structures of the backlight unit according to the embodiment corresponding to FIG. 3 may be the same as those of the backlight unit according to the embodiment corresponding to FIG. 1, and detailed description thereof is omitted here.

Advantageous technical effects of the backlight unit according to any one of the foregoing embodiments are at least as follows. By providing the light shielding structure on the light exit surface of the first protrusion portion of the light guide plate, and making the light shielding structure partially cover the light exit surface of the first protrusion portion, not only a light leakage phenomenon occurring at a position at which the first protrusion portion 4 is provided is mitigated or eliminated, but also a locally brightening phenomenon or a locally darkening phenomenon is prevented from occurring at the position at which the first protrusion portion 4 is provided, thereby increasing the performance of the backlight unit.

An embodiment of the present disclosure provides a display device, which includes the backlight unit according to any one of the foregoing embodiments of the present disclosure.

By including the backlight unit according to any one of the foregoing embodiments of the present disclosure, the display device has improved display effects.

The display device according to an embodiment of the present disclosure may be any product or component having a display function, such as a liquid crystal panel, a liquid crystal television, a display, a mobile phone, a navigator, and the like.

Some embodiments of the present disclosure provide a method for manufacturing a backlight unit. Referring to FIGS. 1 to 4, the method may include the following steps S1 to S3.

The step S1 includes forming a light guide plate 2, such that the light guide plate 2 includes a main body 21 and a first protrusion portion 4 protruding from a side of the main body 21. For example, the light guide plate 2 may be formed by using a material and a process which are known in the art.

The step S2 includes forming a plastic frame 6, such that the plastic frame 6 is provided at a periphery of the side of the light guide plate 2, a side of the plastic frame 6 proximal to the light guide plate 2 has an engaging groove 7 provided thereat, and the first protrusion portion 4 of the light guide plate 2 protrudes towards the plastic frame 6 and is engaged in the engaging groove 7. For example, the plastic frame 6 may be formed by using an injection molding process with a white plastic.

The step S3 includes forming a light shielding structure 5, such that the light shielding structure 5 is provided on a light exit surface of the first protrusion portion 4, and an orthographic projection of the light shielding structure 5 on the light exit surface of the first protrusion portion 4 partially covers the light exit surface of the first protrusion portion 4. For example, the light shielding structure 5 may be formed by coating a black ink on the light exit surface of the first protrusion portion 4.

In an embodiment, the step of forming a light shielding structure (i.e., the step S3) may include the following steps S31 and S32.

The step S31 includes forming a first portion 51 of the light shielding structure 5, such that the first portion 51 covers outer edges of the light exit surface of the first protrusion portion 4.

The step S32 includes forming a second portion 52 of the light shielding structure 5, such that the second portion 52 covers a portion of a central region surrounded by the outer edges of the light exit surface of the first protrusion portion 4, and an area, which is covered by the second portion 52, of the light exit surface of the first protrusion portion 4 gradually decreases as the second portion 52 extends from a side of the first protrusion portion 4 distal to the main body 21 to a side of the first protrusion portion 4 proximal to the main body 21.

In other embodiments, the method may further include steps of forming the remaining components of the backlight unit according to any one of the foregoing embodiments of the present disclosure, and details thereof may refer to the foregoing description.

The embodiments of the present disclosure may be combined with each other, without any explicit conflict caused by the combination.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A backlight unit, comprising
a light guide plate comprising a main body and a first protrusion portion protruding from a side of the main body;
a plastic frame provided at a periphery of the side of the light guide plate, wherein a side of the plastic frame proximal to the light guide plate has an engaging groove provided thereat, and the first protrusion portion of the light guide plate protrudes towards the plastic frame and is engaged in the engaging groove; and
a light shielding structure provided on a light exit surface of the first protrusion portion, wherein an orthographic projection of the light shielding structure on the light exit surface of the first protrusion portion partially covers the light exit surface of the first protrusion portion;
wherein the light shielding structure comprises a first portion and a second portion;
the first portion covers outer edges of the light exit surface of the first protrusion portion; and
the second portion covers a portion of a central region surrounded by the outer edges of the light exit surface of the first protrusion portion, and an area, which is covered by the second portion, of the light exit surface of the first protrusion portion gradually decreases as the second portion extends from a side of the first protrusion portion distal to the main body to a side of the first protrusion portion proximal to the main body.

2. A display device, comprising the backlight unit according to claim 1.

3. The backlight unit according to claim 1, wherein the light exit surface of the first protrusion portion is a rectangle, a side of the rectangle is attached to the main body, a direction from a side of the rectangle distal to the main body to a side of the rectangle proximal to the main body is a first direction, and a direction perpendicular to the first direction is a second direction; and
the second portion comprises at least one first pattern, and a size of each of the at least one first pattern in the second direction gradually decreases as the at least one first pattern extends in the first direction.

4. The backlight unit according to claim 3, wherein each of the at least one first pattern is an isosceles triangle.

5. The backlight unit according to claim 3, wherein each of the at least one first pattern is a trapezoid.

6. The backlight unit according to claim 3, wherein the second portion comprises a plurality of first patterns, and the plurality of first patterns are arranged sequentially in the second direction with a same interval therebetween.

7. The backlight unit according to claim 5, wherein a length ratio of a short base to a long base of the trapezoid ranges from 1/4 to 1/2.

8. The backlight unit according to claim 3, wherein a size of a part of the first portion, which covers one of the outer edges of the light exit surface of the first protrusion portion, in the second direction ranges from 1/20 to 1/10 of a size of the first protrusion portion in the second direction.

9. The backlight unit according to claim 3, wherein a size of a part of the first portion, which covers one of the outer edges of the light exit surface of the first protrusion portion, in the first direction ranges from 1/20 to 1/10 of a size of the first protrusion portion in the first direction.

10. The backlight unit according to claim 1, wherein the light shielding structure is in contact with the light exit surface of the first protrusion portion.

11. The backlight unit according to claim 1, further comprising an optical film provided on the light exit surface of the light guide plate, wherein the optical film comprises a second protrusion portion extending into the engaging groove, and the light shielding structure is provided on a side of the second protrusion portion distal to the light guide plate.

12. The backlight unit according to claim 1, wherein the light shielding structure is made of a black ink.

13. The backlight unit according to claim 3, wherein in the first direction, two ends of each of the at least one first pattern are both in contact with the first portion.

14. The backlight unit according to claim 6, wherein in the second direction, edges of any adjacent two of the plurality of first patterns distal to the main body are in contact with each other.

15. The backlight unit according to claim 4, wherein a bottom side of the isosceles triangle is parallel to the side of the first protrusion portion distal to the main body.

16. The backlight unit according to claim 5, wherein the trapezoid is an isosceles trapezoid.

17. The backlight unit according to claim 5, wherein a long base of the trapezoid is parallel to the side of the first protrusion portion distal to the main body.

18. A method for manufacturing a backlight unit, comprising
forming a light guide plate, wherein the light guide plate comprises a main body and a first protrusion portion protruding from a side of the main body;
forming a plastic frame, wherein the plastic frame is provided at a periphery of the side of the light guide plate, a side of the plastic frame proximal to the light guide plate has an engaging groove provided thereat, and the first protrusion portion of the light guide plate protrudes towards the plastic frame and is engaged in the engaging groove; and
forming a light shielding structure, wherein the light shielding structure is provided on a light exit surface of the first protrusion portion, and an orthographic projection of the light shielding structure on the light exit surface of the first protrusion portion partially covers the light exit surface of the first protrusion portion;
wherein the forming a light shielding structure comprises
forming a first portion of the light shielding structure, wherein the first portion covers outer edges of the light exit surface of the first protrusion portion; and
forming a second portion of the light shielding, structure, wherein the second portion covers a portion of a central region surrounded by the outer edges of the light exit surface of the first protrusion portion, and an area, which is covered by the second portion, of the light exit surface of the first protrusion portion gradually decreases as the second portion extends from a side of the first protrusion portion distal to the main body to a side of the first protrusion portion proximal to the main body.

* * * * *